Nov. 17, 1936.   R. G. WHITLOCK ET AL   2,060,840
CONDUIT CAP
Filed April 30, 1934   5 Sheets-Sheet 1
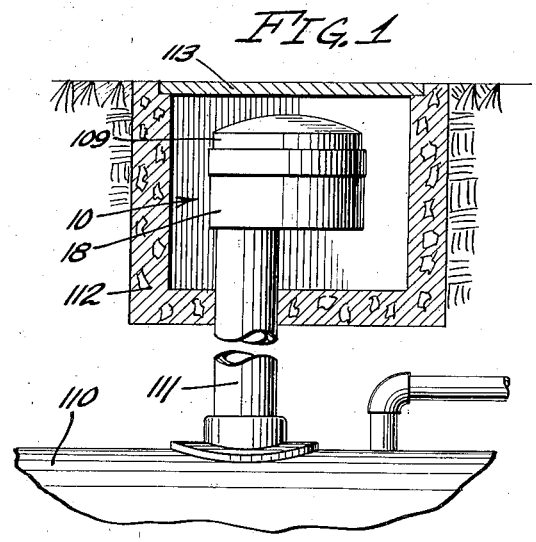
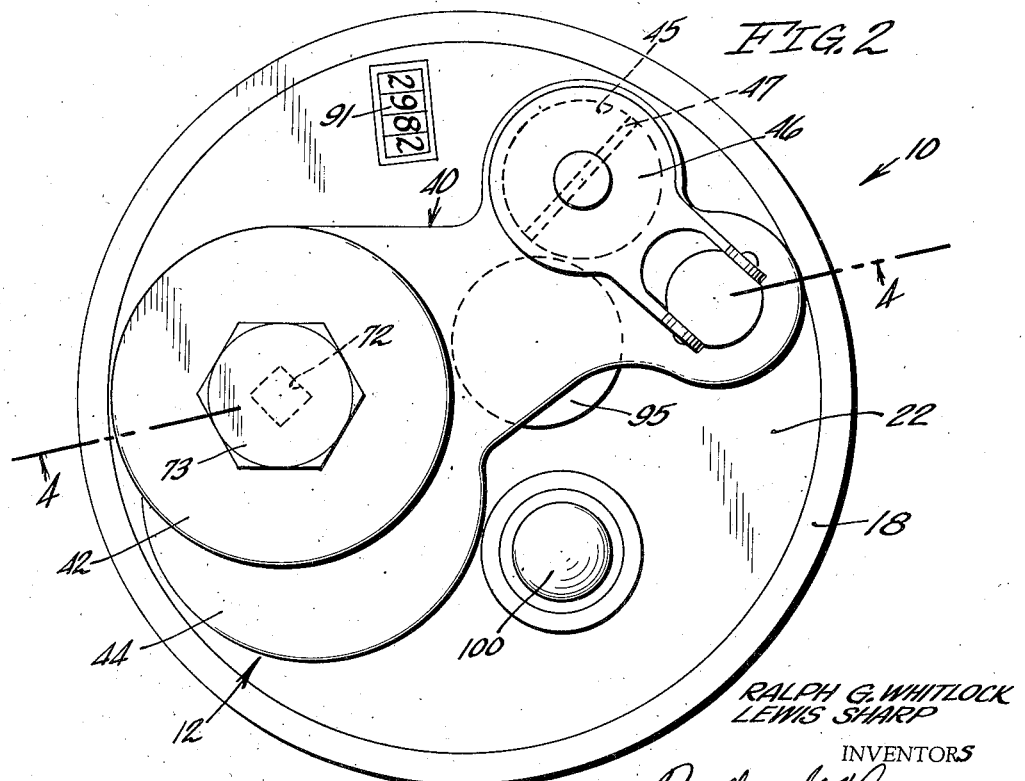
RALPH G. WHITLOCK
LEWIS SHARP
INVENTORS
BY Ralph G. Whitlock
Lewis Sharp
ATTORNEY.

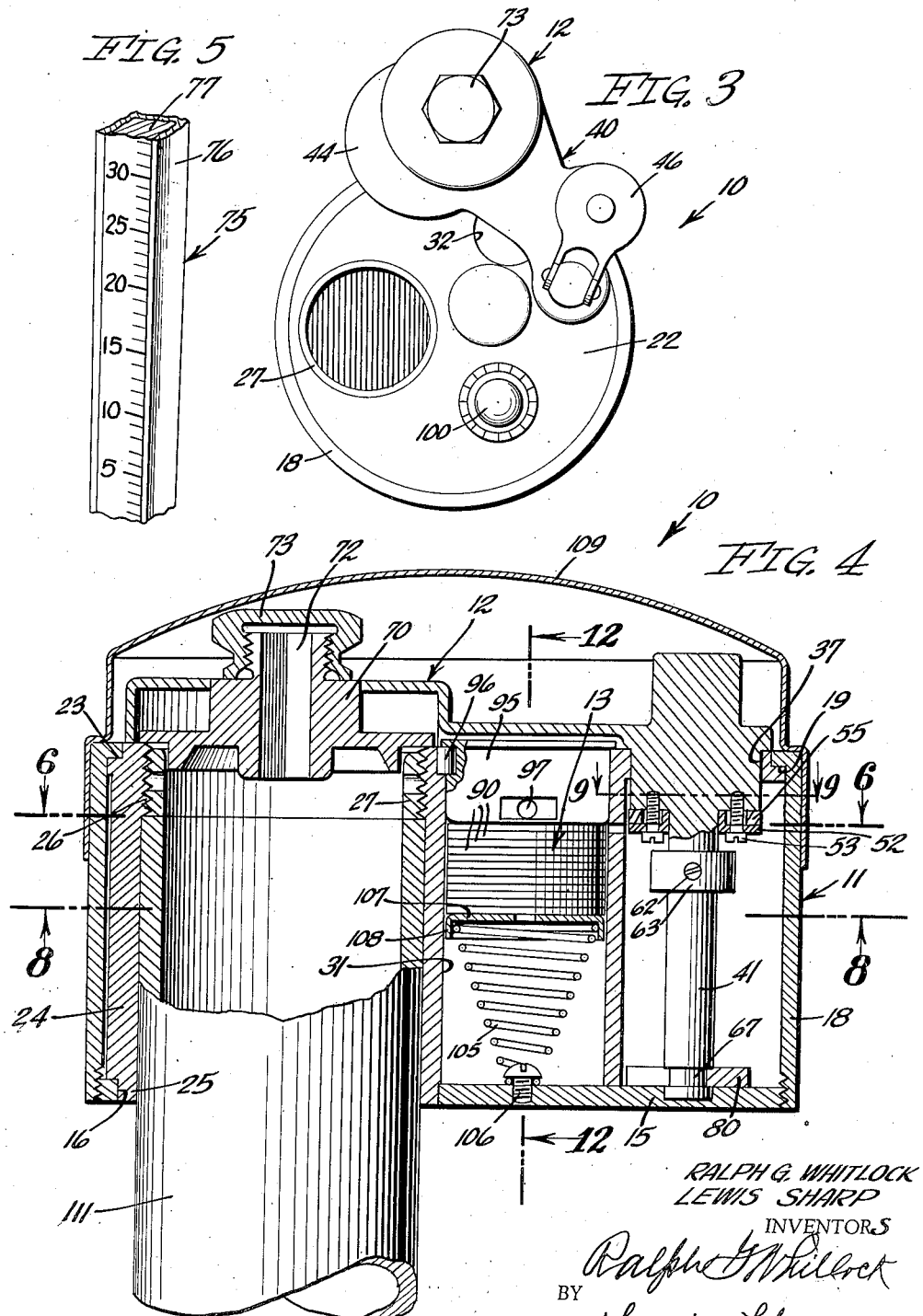

Nov. 17, 1936.                R. G. WHITLOCK ET AL                 2,060,840
                                  CONDUIT CAP
                              Filed April 30, 1934                 5 Sheets-Sheet 3
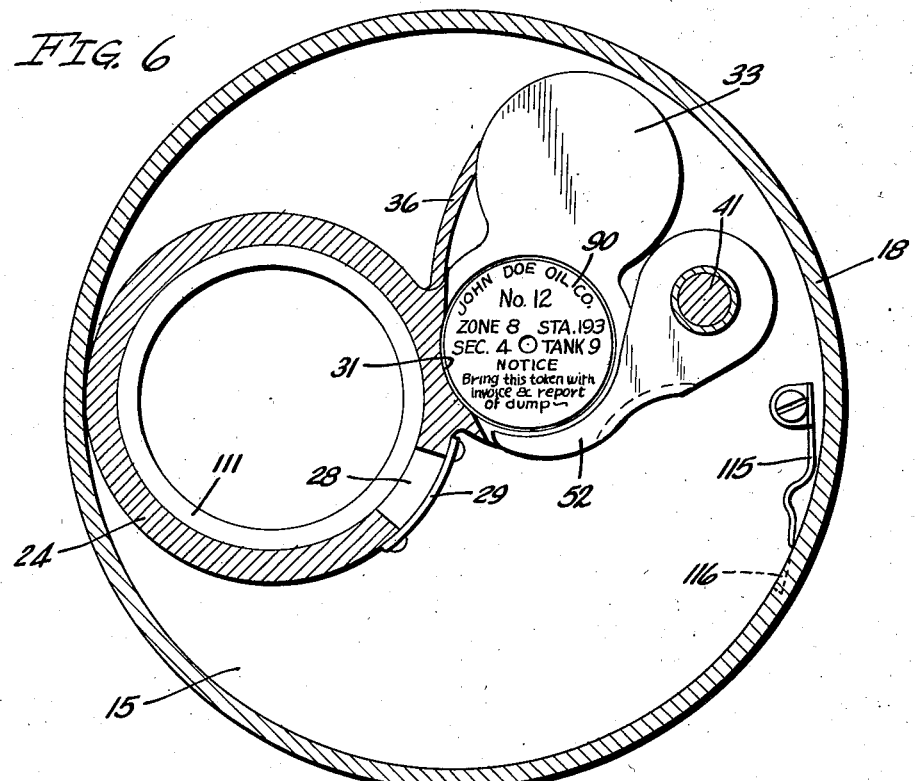
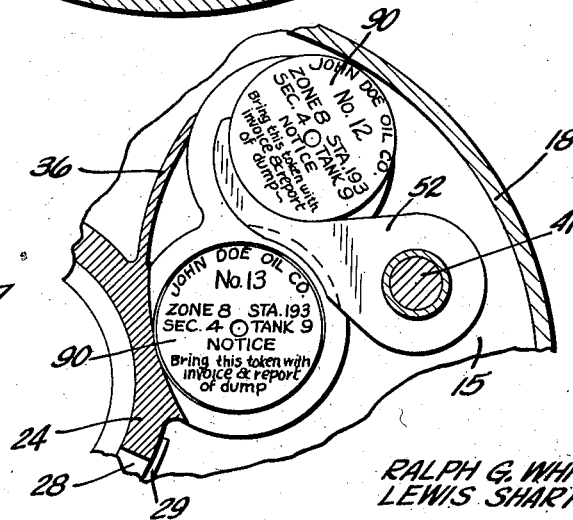
RALPH G. WHITLOCK
LEWIS SHARP
INVENTORS
BY *Ralph G. Whitlock*
*Lewis Sharp*
ATTORNEY.

Nov. 17, 1936.      R. G. WHITLOCK ET AL      2,060,840
CONDUIT CAP
Filed April 30, 1934      5 Sheets-Sheet 4
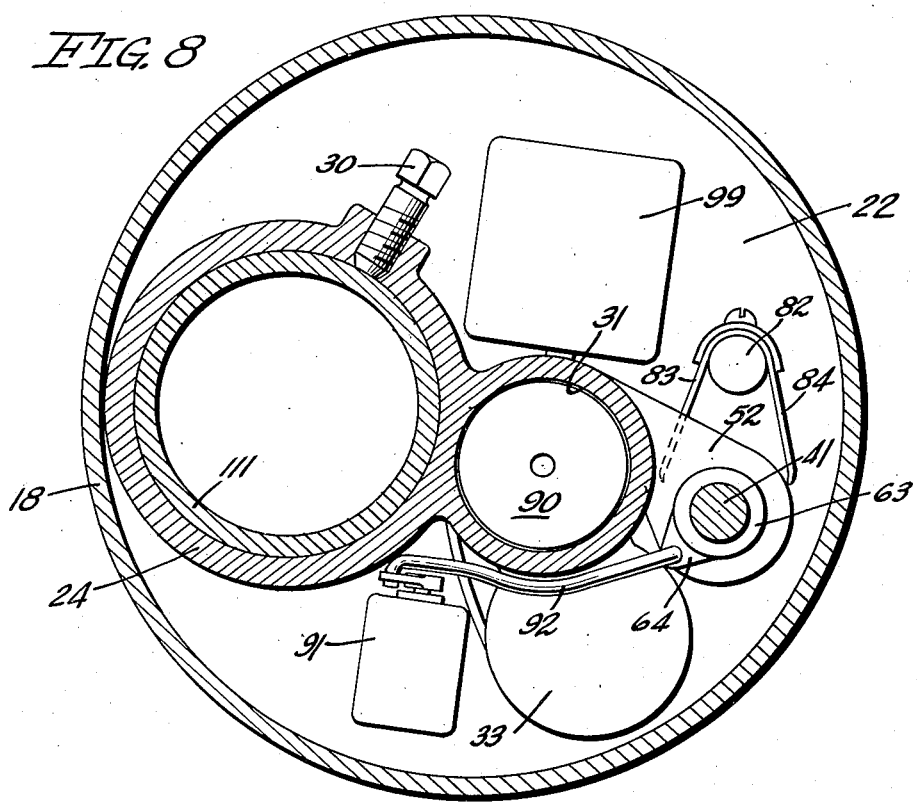
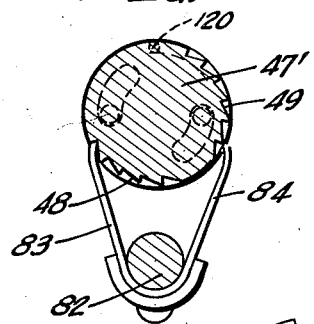
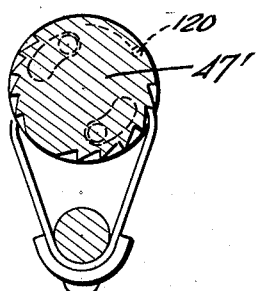
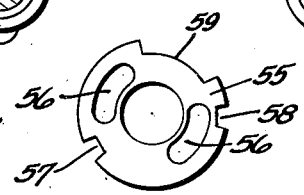
RALPH G. WHITLOCK
LEWIS SHARP
INVENTORS
BY
ATTORNEY.

Nov. 17, 1936. R. G. WHITLOCK ET AL 2,060,840
CONDUIT CAP
Filed April 30, 1934 5 Sheets-Sheet 5

RALPH G. WHITLOCK
LEWIS SHARP
INVENTORS

BY
ATTORNEY.

Patented Nov. 17, 1936

2,060,840

UNITED STATES PATENT OFFICE 2,060,840

CONDUIT CAP

Ralph G. Whitlock, Los Angeles, and Lewis Sharp, Huntington Park, Calif., assignors to Federal Foundation Inc., Las Vegas, Nev., a corporation of Nevada Application April 30, 1934, Serial No. 723,156

15 Claims. (Cl. 221—67)

Our invention relates to closures for containers, and more particularly to a meter cap for the inlet conduit of a gasoline storage tank such as used by automobile service stations.

The practice of "night dumping", often followed by dishonest service station owners and operators, is the filling of gasoline storage tanks with cheap gasoline of low quality, this being sold at a higher price and dispensed through a pump bearing the brand of a high quality product. In a like manner, the high quality gasoline contained in such storage tanks is often blended with a quantity of low quality fuel and sold at a high price.

It is an object of our invention to provide a cap for the fill pipe of a gasoline storage tank that will leave a record for each opening of the cap, thus making the practice of "night dumping" impossible without detection.

The high government taxes on the sale of gasoline for motor cars has greatly encouraged tax evasion by gasoline refineries, a practice that has risen to tremendous proportions due to recent increases in gasoline tax rates.

Another object of our invention is to provide a cap for a gasoline storage tank fill pipe that will prevent unauthorized access to such fill pipes by recording the number of times said cap is opened. This will provide a check on the number of dumps made and greatly assist the government in reducing such tax evasions to a minimum.

Another object of our invention is to provide a cap which is effectively locked to a fill pipe to prevent bodily removal of said cap without mutilation of a part thereof.

Another object of our invention is to provide a cap through which a storage tank may be gauged with a sounding stick while remaining substantially closed to the dumping of gasoline in the tank.

A still further object of our invention is to provide a cap which must be completely closed after each dumping operation to complete the record of said dumping operation.

Still another object of our invention is to provide a cap which is small in size and extremely simple in construction and operation.

Further objects and advantages will be made manifest in the following description taken in connection with the accompanying drawings in which:

Fig. 1 is a diagrammatic view showing a preferred embodiment of our invention installed on the fill pipe of a gasoline storage tank.

Fig. 2 is an enlarged plan view of the cap shown in Fig. 1, the cover thereof being removed.

Fig. 3 is a reduced plan view similar to Fig. 2 showing another position of the parts shown therein.

Fig. 4 is a vertical sectional view taken on the lines 4—4 of Fig. 2.

Fig. 5 is a fragmentary perspective view showing a preferred form of gauge stick to be used with the cap of our invention.

Fig. 6 is a horizontal sectional view taken on the line 6—6 of Fig. 4.

Fig. 7 is a fragmentary view similar in part to Fig. 6 showing another position of the mechanism shown in Fig. 6.

Fig. 8 is a horizontal sectional view taken on the line 8—8 of Fig. 4, and looking upward as indicated by the arrows of line 8—8.

Fig. 9 is a horizontal sectional view taken on the line 9—9 of Fig. 4.

Fig. 10 is a view similar to Fig. 9 but showing another position of the parts shown in Fig. 9.

Fig. 11 is a detail view of a portion of the mechanism shown in Figs. 9 and 10.

Referring specifically to the drawings, a conduit cap 10, comprising a preferred embodiment of our invention, is shown in Fig. 4, this cap including housing 11, a closure member 12 and a register mechanism 13.

Figure 12:
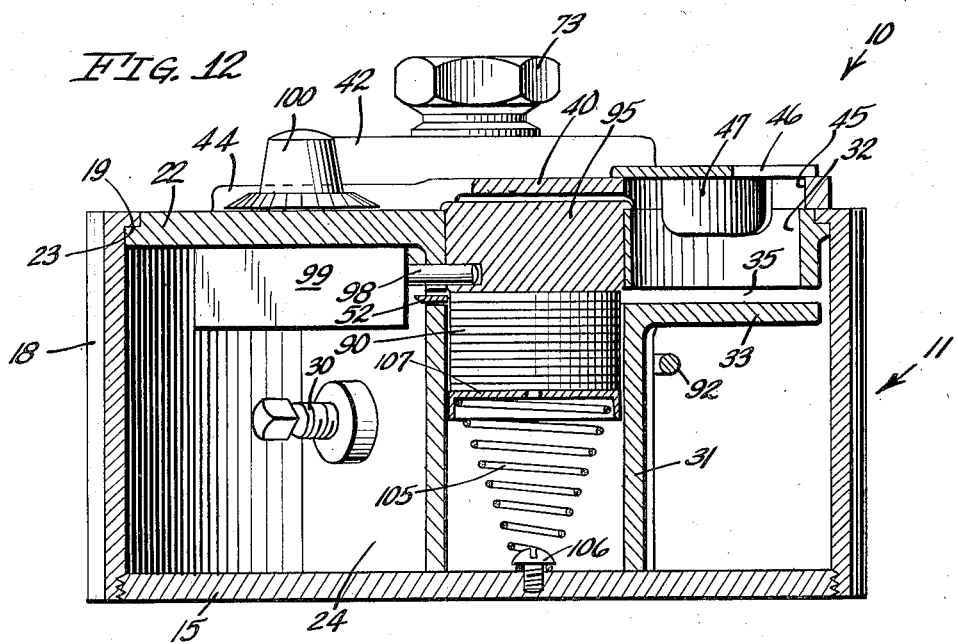
Fig. 12 is a vertical sectional view taken on line 12—12 of Fig. 4.

The housing 11 includes a base plate 15 having a relatively large opening 16 at one side thereof. Threadedly mounted on the periphery of the base plate 15 is an annular upstanding wall 18 formed to provide an inwardly disposed shoulder 19 adjacent to the upper edge thereof. Positioned in the upper end of the annular wall 18 is a deck plate 22, the latter having a shoulder 23 at its outer edge engaging the aforementioned shoulder 19 of the annular wall 18 as shown in Fig. 4. Extending downward from deck plate 22 is tubular portion 24 the lower end of which is reduced in diameter as indicated at 25 and is received by the aforementioned opening 16 in the base plate 15. Formed in the upper end of the tubular portion 24 are threads 26 into which a thread protecting ring 27 is screwed as shown in Fig. 4. Formed on one side of the tubular portion 24, as shown in Fig. 6 is an opening 28 covered by a relatively thin plate 29, the purpose of which will be described hereinafter. Also provided on the tubular portion 24 is a set screw 30 as seen in Figs. 8 and 12. Extending downward from the deck plate 22 adjacent the tubular portion 24 is a token well 31, it being noted that the tubular portion 24 and well 31 are cast integral with the deck plate 22. Also cast integral with deck plate 22 is a cup 32 having a bottom wall 33. As shown in Fig. 12 the cup 32 is positioned adjacent the well 31 and is provided at its bottom with a horizontal opening 35, the latter communicating with the interior of the well 31. Extending from the well 31 to the cup 32 is an arcuate finger 36 as shown clearly in Figs. 6 and 7. Formed through the deck plate 22 in close proximity with the upper end of the well 31 is an opening 37 as shown in Fig. 4.

Figure 13:
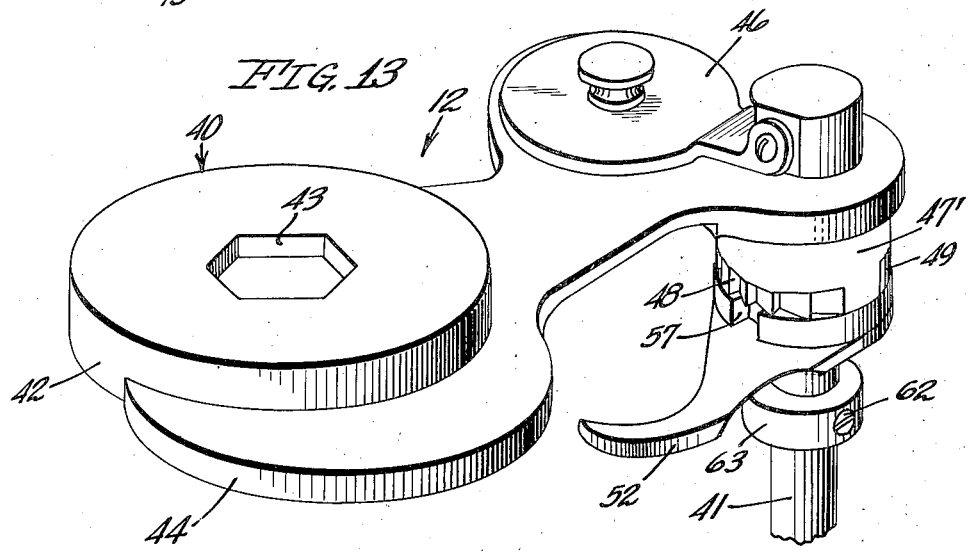
Fig. 13 is an enlarged detail perspective view of a portion of the cap of our invention.

The closure member 12 includes a horizontal arm 40, having a vertical shaft 41 cast integral therewith. The arm 40 is formed as shown in Fig. 13 to provide an inverted cup 42 having a hexagonal central opening 43 provided therein. Extending horizontally from one side of the cup 42 is a lip 44, the purpose of which will be made clear hereinafter. Also formed in the horizontal arm 40 is an opening 45 positioned adjacent the aforementioned shaft 41. Hinged on the member 40 is a cover plate 46 having a vertical web 47 on the underside thereof, the web fits snugly through the opening 45 and into the upper end of the cup 32, so as to normally prevent movement of the closure 46 relative to the deck plate 22. Formed integral with the shaft 41 adjacent the underside of the member 40 is a collar 47' the latter having two groups of ratchet teeth 48 and 49 formed on the periphery thereof. Fixed on the shaft 41 is a token discharging arm 52 which is retained in position by screws 53, the latter extending upward into the collar 47 as shown in Fig. 4. Mounted on the shaft 41 between the collar 47' and the token ejecting arm 52 is a collar 55 having slots 56 for receiving the screws 53 as shown in Fig. 11. Provided on the periphery on the collar 55 are two notches 57 and 58 and an elongated notch 59. Fixed on the shaft 41 below the token ejecting arm 52 by a set screw 62 is a collar 63 having an apertured arm 64 formed integral therewith as shown in Fig. 8. As shown in Fig. 4 the shaft 41 is formed at its lower end to provide an annular groove 67.

Slidable vertically in the hexagonal opening 43 of the cup 42 of the member 40 is a stud 70, the lower face of which is reduced in diameter and is normally received by the upper end of the tubular portion 24 as shown in Fig. 4. Extending vertically through the stud 70 is a square opening 72 the upper end of which is normally closed by a removable cap 73. The opening 72 is adapted to closely receive a gauge stick 75, shown in Fig. 5, having a metal channel portion 76, the latter being inlaid with a wooden portion 77. Portion 77 of the gauge stick 75 is suitably calibrated as shown to indicate the quantity of liquid within the storage tank in a manner to be described hereinafter.

The closure member 12 is mounted in the cap 10 as shown in Fig. 4, it being noted that the collar 47' is received by the aforementioned opening 37 in the deck plate 22. Lower end of the shaft 41 is received by a suitable recess in the base plate 15, the shaft 41 being retained against vertical displacement by a slotted washer 80 fixed to the base plate 15 so as to engage the annular groove 67 of the shaft 41 as shown.

Mounted on the under side of the deck plate 22 on a suitable stud 82 is a pair of spring pawls 83 and 84 the extremities of which contact the toothed collar 47 on the shaft 41 as shown in Fig. 8.

The registering mechanism 13 includes a plurality of tokens 90 and a counter 91. As shown in Fig. 8 the counter 91 is fixed to the underside of the deck plate 22 and is operated in response to rotation of the shaft 41 by a link 92 extending from the counter 91 to the aforementioned apertured arm 64 of the collar 63. The tokens 90 are enclosed within the well 31 by a plug 95 the latter being positioned within the upper end of the well 31 by a key 96 as shown in Fig. 4. Formed on one side of the plug 95 is an opening 97 positioned to receive the bolt 98 of a lock 99, latter being secured to the underside of the deck plate 22 as shown in Fig. 12. The lock 99 is preferably of the combination type having a dial 100 accessible from the upper side of the deck plate 22 as shown. The tokens 90 are urged upwardly within the well 31 against the plug 95 by a compression spring 105, the lower end of the latter being secured to the base plate 15 as by a screw 106. Interposed between the upper end of the spring 105 and the tokens 90 is an inverted cup 107 having an annular flange 108 formed thereon. The deck plate 22 and mechanism thereon is enclosed by a cover 109.

The tokens 90, as shown in Fig. 6, are identified with the station and tank as shown in Fig. 6; it is also to be noted that each of the tokens 90 is individually numbered to identify each from the other.

Referring particularly to Fig. 1, we have shown fragmentarily therein a gasoline storage tank 110 having a fill pipe 111 extending upwardly therefrom into a suitable subterranean box 112 having a removable cover 113. The cap 10 of our invention is positioned on the upper end of the fill pipe 111, the latter extending into the tubular portion 24 and locked therein by tightening the set screw 30. In mounting the cap 10 on the fill pipe 111 the annular wall 18 is unscrewed from the base plate 15, the latter being first placed over the fill pipe 111. The deck plate 22 is now positioned on the fill pipe 111 by sliding the tubular portion 24 thereof downward over the end of the pipe 111. The set screw 30 is then tightened and the annular wall 18 is screwed onto the base plate 15 until the shoulders 19 and 23 engage so as to press the tubular portion 24 and the lower end of the well 31 firmly against the base plate 15. Referring to Fig. 6, it will be noted that a pawl 115 is mounted on the base plate 15 adjacent to the periphery thereof. Formed in the annular wall 18 adjacent the lower edge thereof is a notch 116, the latter engaging the pawl 115 so as to prevent unscrewing the wall 18 from the base plate 15. It will thus be seen that the housing 11 is securely locked on the upper end of the fill pipe 111 and cannot be removed therefrom without lifting the pawl 115 out of engagement of the notch 116, this being accomplished only by forcing a suitable tool (not shown) through the opening 28 and the plate 29 so as to pull the pawl 115 free from the notch 116 to permit unscrewing of the wall 18.

*Operation*

When it is desired to replenish the supply of gasoline in the storage tank 110 the station operator removes the cover 113 and the cover 109 of the cap 10 and raises the stud 70 out of engagement with the ring 27 by grasping the cap 73 on the upper end thereof, the cover plate 46 must also be raised until the web 47 is free from the cup 32. The closure member 40 is then swung in a clockwise direction to the position in which it is shown in Fig. 3, thus opening the upper end of the fill pipe 111. As the closure member 40 is swung to open position the token ejecting arm 52 swings through the slot 35 and carries the uppermost token of the tokens 90 from the well 31 to the cup 32 as shown in Fig. 7. Gasoline may now be dumped through the fill pipe 111 into the storage tank 110, it being noted in Fig. 3 that when the closure member 40 is in open position the cup 32 is partially closed so as to prevent removal of the token 90 from the cup 32 until the closure member 40 is returned to its normal position shown in Fig. 2. After closing the closure member 40 the opening 45 thereof is brought into registration with the mouth of the cup 32 thus permitting removal of the token 90 from the cup 32. It will be noted at this time that when two tokens are discharged into the cup 32 one of them must be removed therefrom before another dump can be made, it being clear that two tokens lying within the cup 32 will prevent the discharge of a third token into the cup 32. Each time the closure member 40 is opened rotation of the shaft 41 rotates the collar 63 causing the link 92 to actuate counter 91, the latter indicating the total number of dumps made.

Referring now to Figs. 9 and 10, Fig. 9 illustrates the position of the collar 47 in the position it occupies when the closure member 40 is disposed in closed relation with the fill pipe 111. It will be noted when in this position that the pawl 83 is disposed in the notch 57 of the collar 55 in engagement with the ratchet tooth 48, the pawl 84 being held out of engagement with the collar 47 by the periphery of the collar 55. The collar 47 may now be rotated clockwise as viewed in Fig. 9 but may not be reversed until it is moved to the position shown in Fig. 10. At this time a pin 120 on the underside of the collar 47 engages one end of the elongated notch 59 of the collar 55 and rotates the latter until the notch 58 thereof allows the pawl 84 to move into engagement with the teeth 49 of the collar 47. As the pawl 84 is allowed to engage the teeth 49 the pawl 83 is simultaneously forced out of engagement with collar 47 as shown in Fig. 10. The collar 47 may now be rotated anti-clockwise from the position in which it is shown in Fig. 10 to that shown in Fig. 9 but may not be reversed until arriving at the position shown in Fig. 9.

When the closure 12 is returned to closed position after filling the storage tank 110 the token ejecting arm 52 swings under the plug 95 and wedges the tokens 90 down to permit passage of the arm 52 to its normal position shown in Fig. 6. The arm 52 is sharpened on its back edge as seen in Fig. 12 so that it will pass between the plug 95 and tokens 90 as above described.

When the tokens 90 are exhausted in the well 31 the disc 107 is pressed against the plug 95, it being noted that the flange 108 of the disc 107 closes the horizontal slot 35. Any attempt to open the closure member 40 after the exhaustion of the tokens 90 is prevented by the stopping of the token ejecting arm 52 by the flange 108 of the disc 107.

When it is desirable to gauge the contents of the storage tank 110 the operator removes the cover 109 from the cap 10 and unscrews the cap 73 from the stud 70. The gauge stick 75 is then inserted into the opening 72 through the fill pipe 111 to the bottom of the tank 110 in the usual manner.

The tokens 90 are supplied to the cap 10 by an authorized inspector from time to time by unlocking the lock 99 and removing the plug 95 from the upper end of the well 31 thus permitting the fresh supply of tokens to be placed within the well 31.

Although we have shown and described but one preferred form of our invention, it is to be understood that many modifications and changes might be made therein without departing from the spirit and scope of the appended claims.

We claim as our invention:

1. In a meter cap for a storage tank fill pipe, the combination of: a housing mounted on the upper end of said pipe; a closure member movable on said housing to normally close the mouth of said pipe; a stud slidable vertically in said closure member in vertical alignment with the mouth of said pipe, a portion of said stud being normally received by said pipe, said stud being formed to provide a relatively small opening vertically therethrough to permit insertion of a gauge stick into said tank to measure the contents thereof, said stud preventing accidental displacement of said closure member during a gauging operation, access being had to the mouth of said pipe by raising said stud and moving said closure member out of closing relation with the mouth of said pipe.

2. In a meter cap for a conduit, the combination of: a housing on said conduit and adapted to receive and hold a plurality of tokens; a shaft rotatably mounted in said housing; a closure member on said shaft having a position closing and a position opening said conduit; a token magazine within said housing; means to urge said plurality of tokens to one end of said magazine; an arm on said shaft to swing through said token magazine and remove a token therefrom in response to opening said closure, said arm passing entirely out of said magazine, said arm being beveled on the back edge thereof to permit said arm to wedge said stack of tokens free from the end of said magazine to permit said arm to swing through said magazine to normal position in response to closing said closure member.

3. In combination with a tubular body, a stud fitted therein and having a flange overlying said body, a support adjacent said body, a lever pivoted to said support and formed with an inverted cup enclosing said flange, a cap projecting from said stud integrally therewith and designed to slide projectably in said inverted cup to disengage the stud from said body and further designed to provide a hand hold whereby to swing said lever to position said stud laterally of said body.

4. In a device as described, a fluid tank having an inlet, a lever pivoted upon said tank formed at one end with an inverted cup designed to be positioned in registration with said inlet, a stud slidably projectable through and above said cup and formed with a plug designed to project into said inlet to hold said lever against accidental displacement, a reduced portion of said stud above said cup, and means carried by said reduced portion providing a handle.

5. In a device as described, a tank having an inlet, means for closing the same, a carrier for said means, designed to move to a released position, a token magazine, and means operated contemporaneously with said carrier for moving a token out of said magazine to an unreleasable position.

6. In a device as described, a tank having an inlet, a token magazine adapted to hold tokens, means for closing said inlet, a movable carrier for said means, a swiper operated in time with said carrier for pushing a token out of said magazine, and means whereby said carrier stops at a position to render said moved token unremovable.

7. In a device as described, a casing having a fluid inlet body, means for rendering said inlet body inaccessible, lever-operated means for actuating said means, token-exposing means actuated simultaneously with said lever-operated means and a handle for removing said lever-operated means to a position to render said inlet body accessible.

8. In a device as described, a tubular token magazine, a token-supporting means therein, a plug closing the outer end of the magazine, resilient means engaging said supporting means to automatically press each contained token against the plug, a shelf disposed in line with the outermost pressed token to enable the latter to occupy the same, a normally closed inlet member, and means for simultaneously opening said inlet member and for ejecting the last-mentioned token upon said shelf.

9. In a device as described, a fixed shelf, a tubular token magazine whose upper edge is formed in a plane therewith, a piston in said magazine, retractable yieldable means normally supporting said piston in a position where it projects partially above said shelf, said piston adapted to mount tokens, displaceable means engageable with said tokens to depress the pistons below the shelf to allow the uppermost token to be positioned for lateral movement out of the magazine upon the shelf, and means movable to engage either said piston or the uppermost token and effective to move the latter upon said shelf.

10. In a device as described, a casing having a closed top formed with a fluid inlet and with a token-releasing opening, means movably designed to bar said inlet or said opening, alternately, manual means for operating said means, and means for automatically positioning a token opposite to said opening as the first means is movably actuated.

11. In a device as described, a casing having a closed top formed with a fluid inlet and with a token-releasing opening, means for positioning a token inside said casing opposite and under said opening for removal, and unitary means manually operable to alternately close the fluid inlet or to bar said opening to prevent release of the token.

12. In a device as described, a casing having a closed top formed with an inlet body and with a token-exposing and releasing opening, means carried by said casing movable from a position barring said opening to a position to render said inlet body inaccessible, and means acting in time with the other means for positioning a token inside of said casing opposite said opening.

13. In a device as described, a casing having a closed top formed with a fluid opening, a token refill opening and with a token releasing opening, a token magazine under said token refill opening adapted to hold tokens, a cover for said token-releasing opening, a cover for said fluid opening, movable simultaneously with the other cover whereby when one cover engages the fluid opening, the other cover is disengaged from the token releasing opening, and means operated together with both covers for ejecting a token out of the magazine and positioning the same opposite the token release opening.

14. In a device as described, a casing having a closed top provided with a token magazine opening thereout at one point and with a token-release chamber opening out at another point, means for moving a token out of said magazine into said chamber, a cover for said chamber and means operable as the cover moves over said chamber for actuating the other means.

15. In a device as described, a body having a token-magazine and an adjacent token-release chamber, means movable across said magazine to push a token out of the latter into said chamber and an outside cover for said chamber and also designed to actuate said means.

RALPH G. WHITLOCK.
LEWIS SHARP.